April 21, 1953        B. W. HULFISH        2,635,651

JIGSAW WITH DRIVE OF SCOTCH YOKE TYPE

Filed March 22, 1947        6 Sheets-Sheet 1

April 21, 1953  B. W. HULFISH  2,635,651
JIGSAW WITH DRIVE OF SCOTCH YOKE TYPE
Filed March 22, 1947  6 Sheets-Sheet 2

April 21, 1953   B. W. HULFISH   2,635,651
JIGSAW WITH DRIVE OF SCOTCH YOKE TYPE
Filed March 22, 1947   6 Sheets-Sheet 3

Inventor:
Buford W. Hulfish
By Christen, Schroeder, Merriam & Hofgren
Attys.

April 21, 1953  B. W. HULFISH  2,635,651
JIGSAW WITH DRIVE OF SCOTCH YOKE TYPE
Filed March 22, 1947  6 Sheets-Sheet 6

Patented Apr. 21, 1953

2,635,651

UNITED STATES PATENT OFFICE 2,635,651

JIGSAW WITH DRIVE OF SCOTCH YOKE TYPE

Buford W. Hulfish, Chicago, Ill., assignor to Birtman Electric Company, a corporation of Illinois Application March 22, 1947, Serial No. 736,462

6 Claims. (Cl. 143—73)

This invention relates to a jig or scroll saw, and particularly to such a saw having improved means for reciprocating the saw blade and preventing the blade from turning about its longitudinal axis.

In jig saw construction, it is necessary that the saw blade be reciprocated longitudinally in substantially a straight line. Various means have been proposed for obtaining this straight line reciprocation, but these have often been cumbersome and erratic in operation. With the structure of the present invention, a motor is provided with the motor driving a rotatable member and the rotatable member operating the reciprocating mechanism and preventing turning of the reciprocating mechanism. The structure for maintaining the reciprocation is simple in construction and requires very little or no attention.

The invention will be described as related to the embodiment shown in the accompanying drawings. Of the drawings.

The jig saw shown in the accompanying drawings comprises a base 20 adapted to rest on a table or other support 21, a base housing 22 supported on the base 20, a lower arm 23 extending from the base housing in an upwardly inclined direction, an upper arm 24 arranged substantially horizontal and attached to the extended end of the lower arm 23 by a vertical portion 25, a work support table 26 mounted above the base housing 22 and adapted to support a board 27 or the like for being sawed, and a saw blade 28 arranged substantially vertically and extending through a hole 29 provided in the work support table 26.

Figure 1:
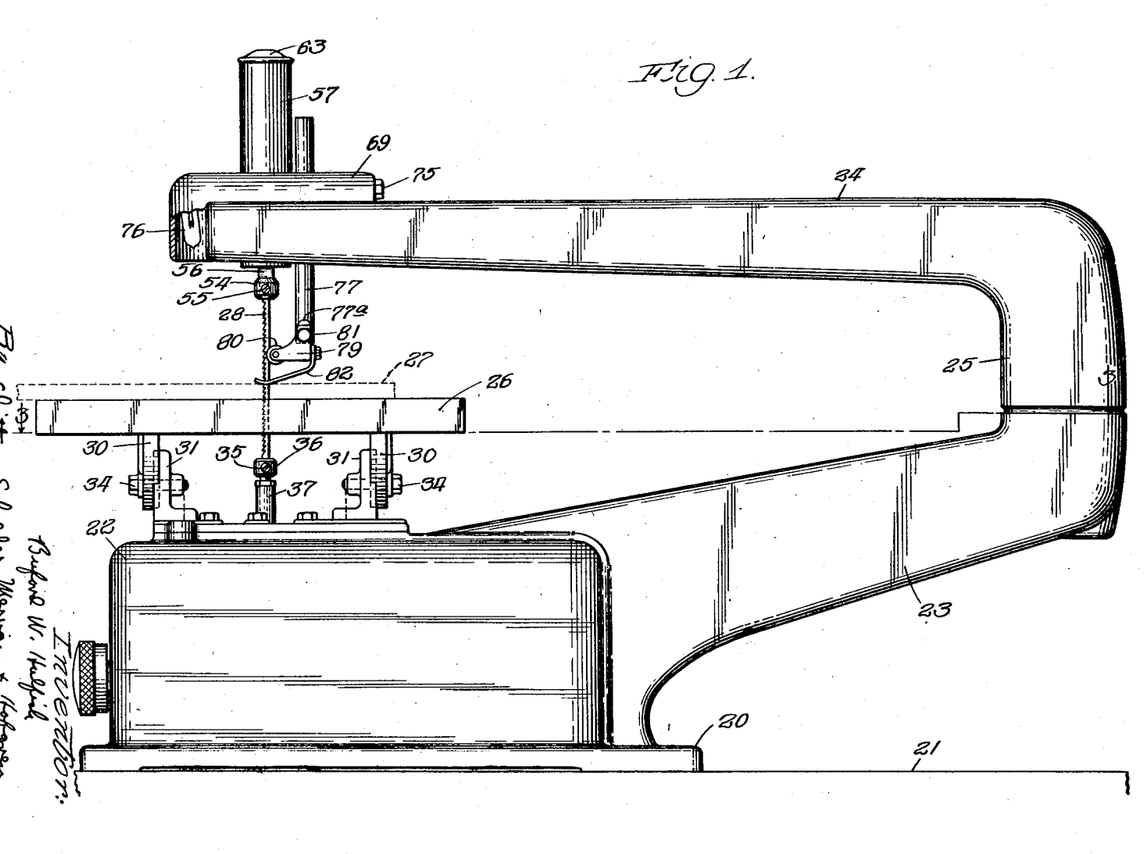
Fig. 1 is a side elevation of a jig saw embodying the invention with portions broken away for clarity of illustration.
Figure 2:
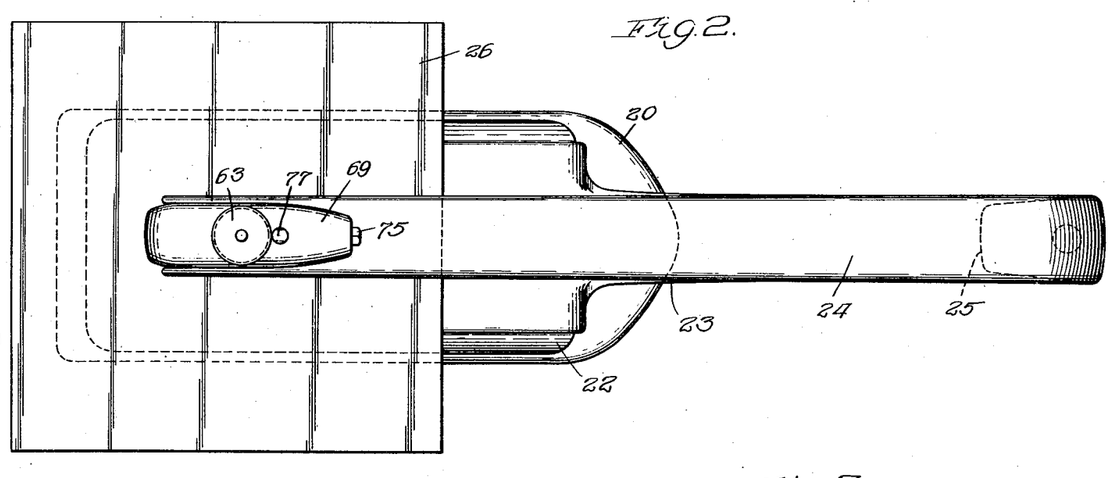
Fig. 2 is a top plan view of the saw of Fig. 1.
Figure 3:
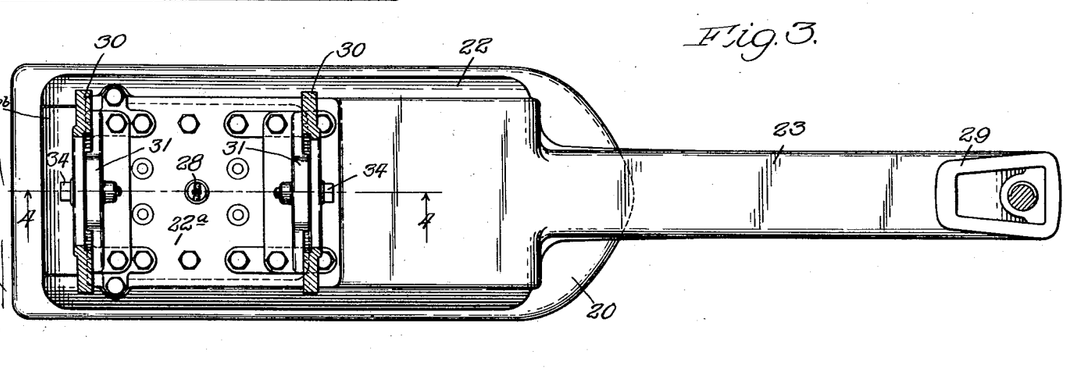
Fig. 3 is a horizontal section taken along line 3—3 of Fig. 1.
Figure 4:
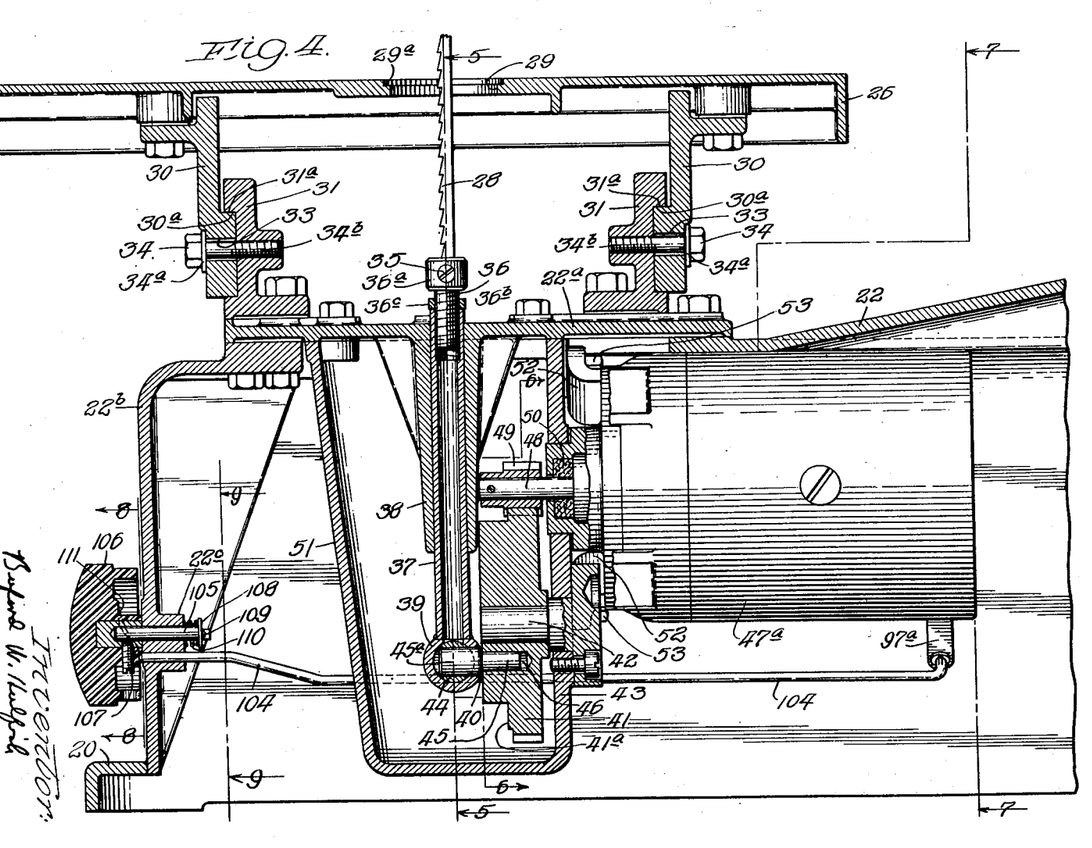
Fig. 4 is a vertical section taken along line 4—4 of Fig. 3.
Figure 5:
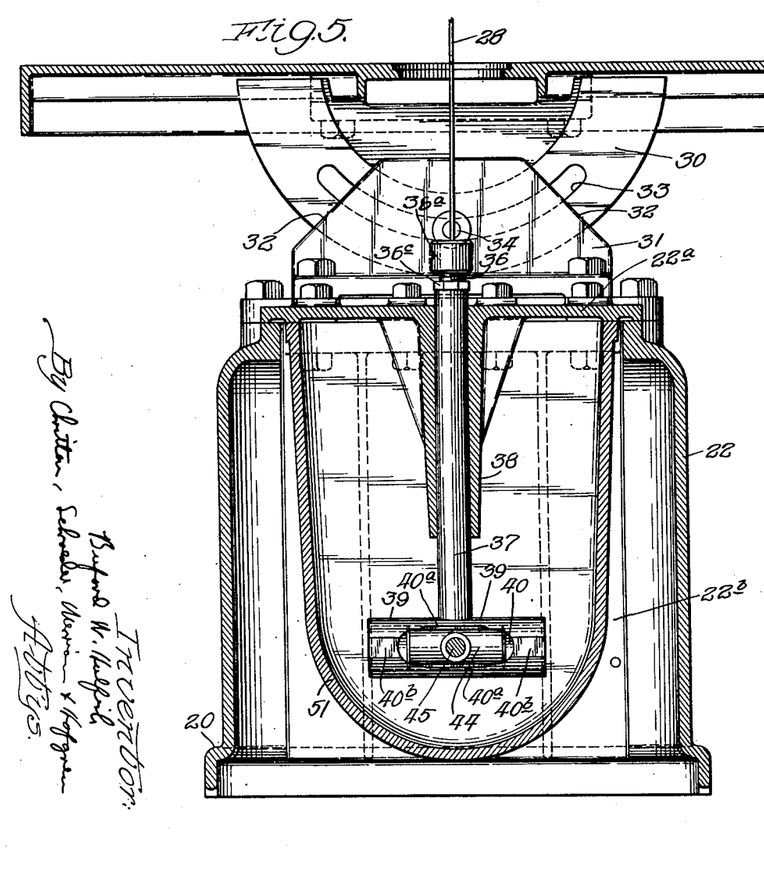
Fig. 5 is a vertical section taken along line 5—5 of Fig. 4.
Figure 6:
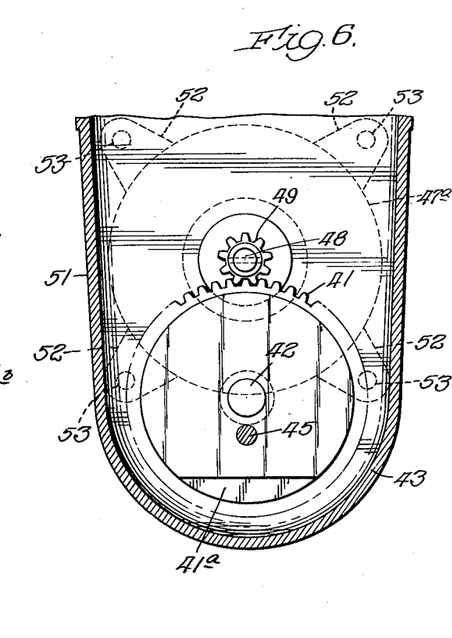
Fig. 6 is a section taken along line 6—6 of Fig. 4.
Figures 7, 8, 9:
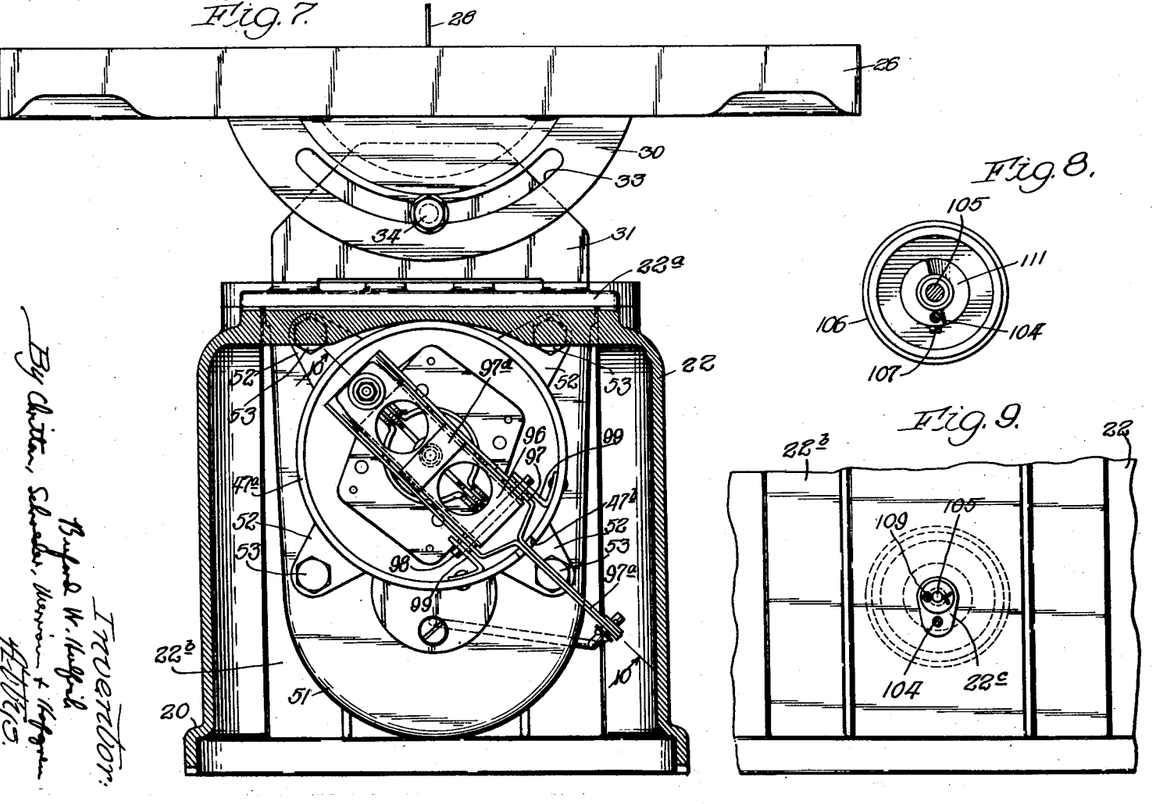
Fig. 7 is a section taken along line 7—7 of Fig. 4.
Fig. 8 is a section taken along line 8—8 of Fig. 4.
Fig. 9 is a section taken along line 9—9 of Fig. 4.
Figures 10, 11, 12, 13, 14:
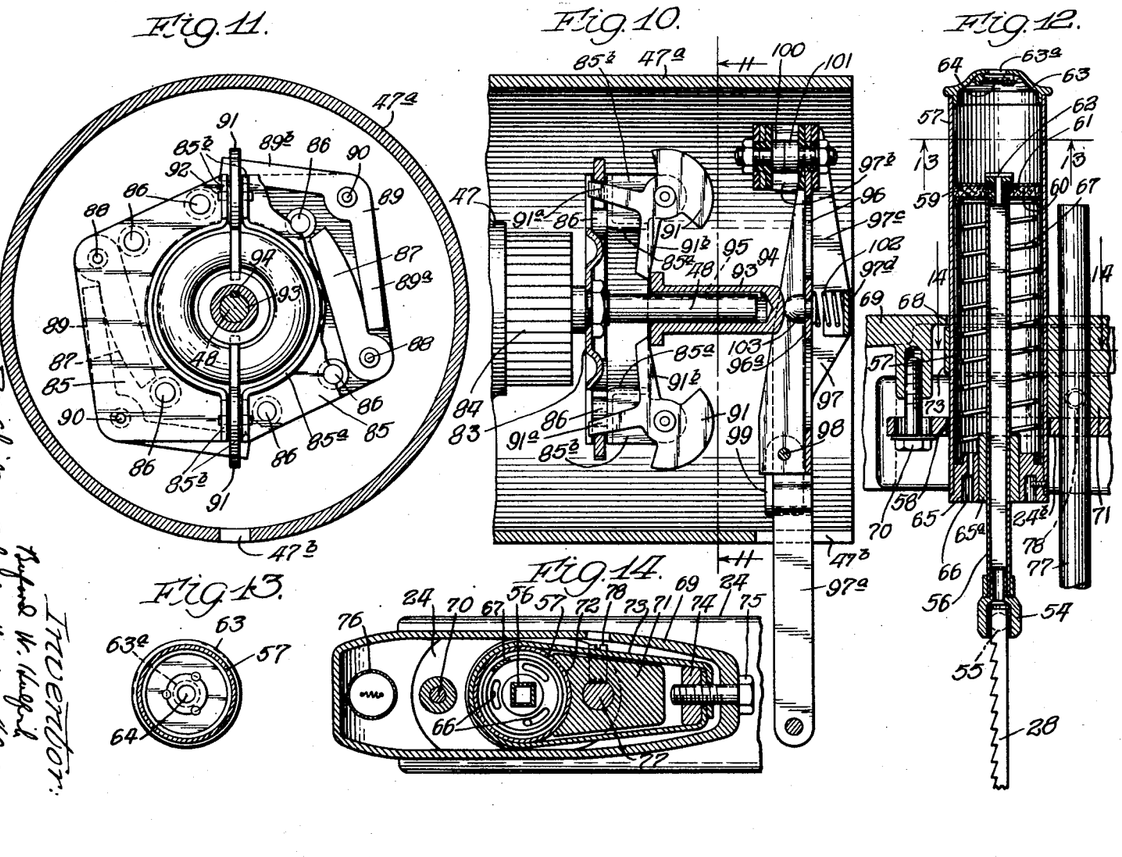
Fig. 10 is a section taken along line 10—10 of Fig. 7.
Fig. 11 is a section taken along line 11—11 of Fig. 10.
Fig. 12 is a vertical section taken substantially through the center of the structure to which the upper end of the saw blade is attached.
Fig. 13 is a section taken along line 13—13 of Fig. 12.
Fig. 14 is a section taken along line 14—14 of Fig. 12.

In Figs. 1 and 12, the saw blade 28 is shown in its uppermost raised position. In Figs. 4 and 5, the blade is shown in its lowered position.

The work support table 26 through which the saw blade 28 extends is provided with two downwardly extending spaced apart arcuate members 30 on its lower surface with these two members being arranged substantially parallel to each other and bolted to the bottom of the table. Each of the arcuate members 30 has an inwardly extending arcuate raised portion 30a on its inner surface. The top surface of base housing 22 is provided with upwardly extending members 31 arranged substantially parallel to each other and having inwardly sloping sides 32. Each upwardly extending member 31 is arranged adjacent an arcuate member 30 and is provided with an arcuate groove 31a which holds a raised portion 30a. Each arcuate member 30 is provided with an arcuate slot 33 and a bolt 34 is provided in each groove with each bolt having a head 34a and a threaded end 34b engaging similarly shaped threads in the upwardly extending member 31. With this construction, the table 26 may be turned either backward or forward to any angle desired and held in position by tightening the bolts 34.

The hole 29 provided in the work support table 26 and through which the saw blade 28 extends is provided with a top countersunk portion 29a extending below the top surface of the table.

The bottom end of the saw blade 28 is removably attached by means of a small screw 35 to a bolt 36 having an enlarged head portion 36a which holds the screw 35 and a threaded shank portion 36b. The shank portion 36b engages similarly shaped threads on the top inner surface of a hollow stem 37. The shank portion 36b is provided with a lock nut 36c to lock it against the hollow stem 37. The stem 37 is slidably held in an annularly shaped extended guide member 38 extending down from the inner surface of the top portion 22a of the base housing 22.

In order to reciprocate the stem 37 and thus the saw blade 28, the bottom of the stem is attached to a transverse hollow portion 39 having a circular cross section and arranged substantially at right angles to the stem 37. The hollow portion 39 is provided with an elongated opening 40 in the form of a slot in one wall thereof. The edges of the slot are cut away as at 40a so that the hollow portion 39 will not interfere with the end of the axle 42. The hollow portion 39 is provided with two flat faces 40b located between the ends of the slot and the ends of the hollow portion 39. Both flat faces are in a single plane and in continuous contact with the face of a heavy gear wheel 41, thereby preventing any turning of the stem 37 about its longitudinal axis. The heavy gear wheel 41 is mounted for rotation on an axle 42 extending from a transverse wall 43 within the housing 22. The gear wheel 41 is arranged substantially parallel to the stem 37 and the guide member 38 and is made heavy or weighted so that it serves as a fly wheel and a counterbalance. Located within the hollow portion 39 is a slidable member 44 which is connected to the gear wheel 41 by a stud 45 having a circular cross section and held in a similarly shaped pocket 46 in the gear wheel. The stud 45 has a portion 45a also of circular cross section, but of larger diameter than the remainder of the stud, engaging a hole in the slidable member 44. The stud 45 is free to rotate in the slidable member 44 and does not rotate in the pocket 46.

On the other side of the transverse wall 43 there is located a motor 47 having a shaft 48 extending through the wall 43 and provided with a pinion gear 49 engaging the gear teeth of the gear wheel 41. The shaft has packing material 50 arranged around it. The transverse wall 43 is one wall of the inner housing 51 surrounding the stem 37, guide member 38, hollow portion 39, gear wheel 41, and pinion gear 49. This inner housing may be kept partly filled with oil so as to provide lubrication to the moving parts of the reciprocating mechanism by means of the gear wheel 41, the lower portion of which extends below the oil level.

When the motor 47 is operated, it turns the gear wheel 41 and this serves to slide the slidable member 44 back and forth in the transverse hollow portion 39, and at the same time prevents any turning of the stem 37 about its longitudinal axis. This movement causes reciprocation of the stem 37 and thus of the blade 28. The elongated opening 40 is slightly longer than the diameter of the circle described by the stud 45 during its movement. When the stud 45, the axle 42, and the stem 37 are in a single plane, the stud 45 will be located at substantially the center of the elongated opening 40.

The motor 47 is provided with four extending equally spaced ears 52, all having base portions lying in substantially a single plane, and the motor is fastened to the transverse wall 43 by bolts 53 extending through the ears 52.

The top end of the saw blade 28 is held in the hollow interior of a collar 54 by means of a screw 55. The collar 54 is attached to the bottom of a hollow stem 56 of non-circular cross section. As shown, the stem is square. The top end of the stem extends up inside a substantially cylindrical housing 57 that is mounted in a hole 58 at the end of the upper arm 24. The top end of the stem 56 is attached to a member 59 extending across the inside of the housing 57 and movable therein. The member 59 is constructed of a packing material 60 held between two parallel plates 61. The packing material 60 serves to form a seal with the inner surface of the housing 57 and the member 59, therefore, acts as a piston. The hollow interior of the stem 56 communicates with the portion of the housing 57 above the piston through a hollow threaded plug 62 extending through the piston member 59. The upper end of the housing 57 is provided with a cap 63 having an opening 63a therein for the entrance of air. Immediately below the opening 63a there is located a flutter valve 64 with the valve being arranged to open as the piston member 59 moves down and close as the piston member 59 moves up.

The stem 56 extends through a guide member 65 extending across the bottom of the housing 57. The portion 65a of the guide member 65 which engages the stem 56 is an oilite bearing or other self-lubricating material and is provided with a square hole through which the stem extends. The remainder of the guide member 65 is provided with three equally spaced arcuate shaped openings 66 communicating with the interior of the housing beneath the piston member 59. These openings need not be equally spaced. Extending between the top of the guide member 65 and the bottom of the piston member 59 there is located a compression spring 67 with this spring being arranged around the stem 56. The compression spring serves to urge the piston member 59 upwardly.

The housing 57 extends through the hole 58 in the upper arm 24 and also through a hole 68 in a cap member 69 mounted on top of the outer end of the upper arm 24. This cap member is held in place by means of bolts 70 extending through the outer end portion 24b of the upper arm 24. One of the bolts (not shown) engages a block 71 which is a part of the cap member 69. This block 71 rests against a machined surface on the top of the arm 24 and has an arcuate outer surface 72 against which the housing 57 is held. The housing is held in place by means of a strap 73 passing around the housing 57, block 71, and a movable nut 74. The nut 74 and strap 73 are held in place by means of a bolt 75 having a threaded end engaging similarly shaped threads in the nut 74. This bolt extends through one wall of the cap member 69. By turning the bolt 75, the nut 74 is moved towards this wall to pull the strap toward the wall and hold the housing 57 tightly against the arcuate surface 72. With this construction, the housing 57 may be arranged in any desired position relative to the cap 69 and the upper arm 24 and the housing becomes free by turning the bolt 75 to move the nut 74 away from this wall. The forward end of the cap 69 extends beyond the end of the upper arm 24 to provide space for an electric light bulb 76. The bottom of the cap 69 below the light bulb 76 is open so that light may shine down on the work.

During the operation of the jig saw, a blast of air is substantially continuously applied to the region adjacent the saw blade 28 to maintain the kerf free of saw dust. When the piston member 59 is moving downwardly, the air is forced out the spaced holes 66 that are located in the guide member 65. During this downward movement, the valve 64 opens to permit air to enter through the hole 63a into the space above the piston member 59. When the piston member 59 moves upwardly, the valve 64 closes and the entrapped air is forced down the hollow stem 56 through the collar 54 and around the top end of the saw blade 28. This air stream is most effective as now the blade is moving upward and drawing saw dust up from the kerf.

In order to hold the saw blade 28 against the work 27 and also to hold the work against the table 26, there is located adjacent the rear of the saw blade a bar 77 arranged parallel to the saw blade and extending through the outer end of the upper arm 24 and the cap member 69. This bar is held in place by means of a lock bolt 78 extending through the side of the block 71. If desired the lock bolt 78 can extend through a hole in the upper arm 24 and carry a knob on its outer end so that the bolt can be easily loosened and tightened. On the bottom of the bar there is located a member 79 extending downwardly and toward the saw blade 28. Mounted on the end of this member there is located a rotatable wheel 80 adapted to bear against the back of the saw blade. The member 79 is held in place by a bolt 81 extending through a slot 77a at the bottom of the bar 77. The position of the member 79 may thus be regulated to various distances above the table 26.

Mounted on the rear surface of the member 79 there is located a downwardly extending foot 82 having a bifurcated lower end adapted to straddle the saw blade 28 and bear against the work 27.

The apparatus for controlling the speed of the motor comprises a plate 83 mounted on the rear end of the extended motor shaft 48 just behind the commutator 84, and adapted to be rotated by the plate, a second plate 85 mounted on the first plate 83 in spaced relationship thereto by means of spacer and mounting members 86 with said plates being divided into two parts and having outwardly extending portions 85a forming an annulus and with each plate having two upstanding ears 85b, a pair of centrifugally responsive arms 87 mounted between the plates 83 and 85 with each arm rotatable about a fulcrum 88 so that centrifugal force tends to force the arms outwardly and bell cranks 89 also mounted between the plates 83 and 85 with each bell crank being rotatably mounted about a fulcrum 90. Each bell crank 89 is arranged substantially between the plates and has one leg 89a in contact with an arm 87 and the other leg 89b lying principally between the plates. As the arm 87 is forced outwardly by centrifugal force, it bears against leg 89a and forces it outwardly also. The bell crank 89 turns around the fulcrum 90 so that the other leg 89b is forced inwardly. Mounted between each pair of adjacent ears 85b, there is located a second bell crank 91 rotatably mounted on a pin 92 extending between the ears. These bell cranks 91 are mounted at substantially right angles to the plate 83 and are so arranged that the free leg 89b of a bell crank 89 bears against the outer surface of a leg 91a of a bell crank 91. The legs 91a extend toward the plate 83. The other leg 91b of the bell crank 91 extends toward the shaft 48. With this construction, the legs 91b of the bell crank 91 are moved toward the outer rear end of the shaft 48 when the arms 87 move outwardly under centrifugal force. The legs 91b bear against a cap member 93 slidably held on the rear end of the shaft 48 and rotatable with the shaft. The cap member 93 is rotatably held by means of a key 94 on the inner surface of the cap member engaging a keyway 95 in the shaft 48. With this construction, as the speed of rotation of the motor shaft 48 is increased, the outward movement of the centrifugally responsive arms 87 are transmitted to outward movement of the cap member 93. The faster the armature and the shaft 48 are revolved, the greater is the outward movement of the cap member 93. The speed of the motor can, therefore, be controlled by providing contact arms opposite the end of the cap member 93 with the force of the outward movement of the cap member serving to separate the arms when the speed reaches a predetermined maximum. This maximum is dependent upon the position of the contact arms relative to the adjacent end of the shaft 48. This entire construction is shown and described in greater detail in the Charles H. Sparklin application Serial No. 580,114, filed February 28, 1945, now Patent No. 2,532,345, issued December 5, 1950.

In the present construction, there are provided an inner contact arm 96 and an outer contact arm 97. The outer contact arm is made of two pieces of sheet metal, or the like, connected together to form a yoke having an end portion 97a extending out of the motor housing 47a through a slot 47b provided therein. A pin 98 is provided extending between the base of the bifurcated portion of the yoke with this pin being held between spaced apart ears 99 mounted on the inner surface of the motor housing 47a on either side of the slot 47b. Both the inner contact arm 96 and the outer contact arm 97 are rotatably mounted on the pin 98 with the inner arm 96 extending between the bifurcated portion of the outer contact arm 97. Both contact arms 96 and 97 extend across the motor housing 47a opposite the end of the cap member 93. On the free end of the outer contact arm 97, there is located an inwardly extending flange 97b upon which is mounted an outwardly extending contact point 100. A similar contact point 101 is mounted on the free end of the inner contact arm 96 with the two contact points being adapted to bear against each other to close the electrical circuit to the motor. The outer contact arm 97 is provided with a pair of outwardly extending side portions 97c extending toward the rear end of the motor housing 47a. These side portions are connected by a bar 97d extending between them. A compression spring 102 is arranged between the bar 97d and the central portion 96a of the inner contact arm 96 opposite the free end of the cap member 93. This central portion 96a is provided with a button 103 adapted to be contacted by the free end of the cap member 93. With this construction the contact arms 96 and 97 may be rotated by means of the end portion 97a of the outer contact arm 97 about the pin 98. This positions the contact arms relative to the outer end of the shaft 48. As the speed of rotation of the motor increases, the cap member 93 bears against the button 103 and forces the inner contact arm 96 outwardly against the compression spring 102. This causes separation of the contact points 100 and 101 and breaks the electrical circuit to the motor. As the speed of the motor decreases, the compression spring 102 forces the contact points back together so that the electrical circuit is again closed. As can be seen, the speed of rotation depends upon the relative position of the contact arms 96 and 97.

The end portion 97a of the outer contact arm 97 is moved by means of a bar member 104 having one end rotatably engaging the end portion 97a and the other end extending through the front 22b of the base housing 22. This end of the bar member 104 extends through a thickened portion 22c of the front of the base housing and is slidably held therein. Mounted on a pin 105 extending through this thickened portion 22c is a control button 106. The control button is held on the outer end of the pin by means of a set screw 107. The inner end of the pin 105 is provided with a collar 108 that is held on the pin by a key 109. This collar 108 is spaced from the inner surface of the thickened portion 22c and a compression spring 110 is arranged between the collar 108 and the inner surface of the thickened portion 22c. This spring serves to hold the control button 106 against the outer surface of the front portion 22b of the base housing 22. The inner surface of the control button 106 is provided with a substantially circular cam surface 111 against which the outer end of the bar 104 bears. As the button 106 is turned, the cam surface 111 causes the bar 104 to be moved longitudinally. This movement of the bar turns the contact arms 96 and 97 around the fulcrum pin 98 and positions the arms relative to the rear end of the motor shaft 48. With the parts at the positions shown in Figs. 4 and 10, the motor will operate at its slowest speed as the inner contact arm 96 is at its nearest distance to the end of the shaft 48. The bar 104, when moved to its farthest distance, moves contact arm 97 relatively close to the end of the shaft 48 thereby compressing the spring 102 and separating the contacts 100 and 101 to create an "off" position.

One of the important features of this invention is the mounting of the motor on the inner housing 51 which serves as the oil casing and connecting the motor directly through gearing to the means for reciprocating the blade. This reduces vibration to a minimum so that the jig saw runs quietly and smoothly. In most prior jig saws vibration and noise were problems primarily due to the inefficient means employed in translating rotary motion to reciprocating motion. Thus, prior jig saws were often jerky, erratic, and noisy. In the present jig saw the weighted over-size gear wheel 41 that serves as a fly wheel also aids in cutting down vibration and noise. The gear wheel 41 is provided with a cut out section 41a on its front face so located that the pin 45 is between this cut out section and the shaft 42. This serves to at least partially compensate for the reciprocating weight of the reciprocating mechanism and reduce the magnitude of vibration. If desired a similar cut out section could be provided on the opposite face of the gear, or on both faces.

The above features also permit the employment of a speed control for the motor as the motor runs smoothly and quietly at all speeds without slipping between the motor and the saw blade. In many prior jig saws, the motor could not be operated at low speeds even if it were so desired because the means for translating the motion were subject to slipping.

Other features of the invention are claimed in my copending applications Serial No. 741,973, filed April 17, 1947, Serial No. 736,282, filed March 21, 1947, and in the Charles H. Sparklin application Serial No. 736,491, filed March 22, 1947.

Having described my invention as related to the embodiment shown in the accompanying drawings, it is my intention that the invention be not limited by any of the details of description unless otherwise specified but rather be construed broadly within its spirit and scope as set out in the accompanying claims.

I claim:

1. In a jig saw including a body portion, a table thereon and a saw blade extending through the table, a reciprocable member adapted to have one end of the blade attached to one end of said member, the other end of said member having a transverse hollow portion thereon with an elongated slot in one side wall thereof, said slot having the outer edges recessed and the transverse hollow portion having a pair of flat co-planar bearing surfaces each located at one end of the slot, guide means for said reciprocable member, a weighted rotatable member having a flat surface in sliding contact with said bearing surfaces throughout the rotation of said weighted member but with said recessed edges spaced from said flat surface to provide a spaced two-point contact of the hollow portion on the flat surface, a stud member mounted in said weighted member and extending through said slot into said transverse hollow portion, a slidable member in said hollow portion mounted on said stud member for sliding movement in the transverse portion on rotation of the weighted member to cause reciprocation of the reciprocable member, and means for rotating said weighted rotatable member about an axis spaced from the stud member, said elongated slot and its recessed edges being at least as long as the diameter of the circle described by the stud member during rotation of the weighted member, said guide means and said pair of co-planar bearing surfaces providing a three-point support serving to hold said reciprocable member against substantial rotation and vibration during its reciprocation.

2. The jig saw of claim 1 wherein said guide means embraces and surrounds a major portion of the length of said reciprocable member to aid in holding said reciprocable member against substantial rotation and vibration during its reciprocation.

3. In a jig saw including a body portion, a table thereon and a saw blade extending through the table, a closed housing within said body portion, a reciprocable member extending into the housing adapted to have one end of the blade attached thereto, an electric motor supported solely on an exterior surface of one wall of the housing, gearing within the housing operatively connecting the inner end of the shaft and the reciprocable member for reciprocating said member and thus the blade on rotating said shaft, and a top plate member forming a part of said housing and to which the remainder of the housing is attached and through which the reciprocable member extends, said plate member extending beyond the side walls of the housing and having the edges of the extending part fastened to the marginal portion surrounding an opening in said body portion so that the housing, the gearing and the motor are all supported from said plate member as a removable unit that is normally located within in said body portion.

4. The jig saw of claim 3 wherein said housing comprises an integral, substantially liquid-tight casing of generally cup-shape with said plate member extending across the top thereof and forming a closure therefor.

5. In a jig saw including a body portion, a table thereon and a saw blade extending through the table, a reciprocable member adapted to have one end of the blade attached to one end thereof, means including a rotatable member operatively connected to the other end of said reciprocable member for reciprocating the same in a substantially straight line, and a three-point guide means aiding in restraining said reciprocable member against substantial vibration during its reciprocation, said guide means including one guide portion embracing said reciprocable member and a pair of spaced guide portions on opposite sides of the line of reciprocation and transverse thereto, the guide portions being operatively attached to the reciprocable member and movable therewith, said pair of guide portions operating against a guide surface during operation of the device and being separated by a recessed part spaced from said guide surface.

6. In a jig saw including a body portion, a table thereon and a saw blade extending through the table, a reciprocable member adapted to have one end of the blade attached to one end thereof, means including a rotatable member operatively connected to the other end of said reciprocable member for reciprocating said reciprocable member in a substantially straight line, and a guide means embracing a major portion of the length of the reciprocable member and extending to a point adjacent the point of connection of the rotatable member to the reciprocable member to aid in restraining the reciprocable member against substantial vibration during its reciprocation, said rotatable member being provided with a flat side adjacent the reciprocable member and the reciprocable member including a pair of spaced co-planar bearing surfaces bearing against said flat side on opposite sides of the line of reciprocation and transverse thereto, the spaced bearing surfaces being separated by a recessed part spaced from said flat side, said spaced bearing surfaces and said guide means providing a three-point support serving to hold said reciprocable member against substantial rotation and vibration during its reciprocation.

BUFORD W. HULFISH.

References Cited in the file of this patent

UNITED STATES PATENTS

| Number | Name | Date |
| --- | --- | --- |
| 1,467,720 | Field | Sept. 11, 1927 |
| 2,049,191 | Bouget et al. | July 28, 1936 |
| 2,073,430 | Tautz | Mar. 9, 1937 |
| 2,116,123 | Ocenasek | May 3, 1938 |
| 2,165,002 | Ocenasek | July 4, 1939 |
| 2,208,843 | Hedgpeth | July 23, 1940 |
| 2,327,239 | Bartlett | Aug. 17, 1943 |
| 2,367,864 | Hein | Jan. 23, 1945 |